(12) United States Patent
Yamaoka et al.

(10) Patent No.: US 10,300,600 B2
(45) Date of Patent: May 28, 2019

(54) CONTROL SYSTEM HAVING LEARNING CONTROL FUNCTION AND CONTROL METHOD

(71) Applicant: FANUC CORPORATION, Yamanashi (JP)

(72) Inventors: Nobuaki Yamaoka, Yamanashi (JP); Hajime Suzuki, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/860,226

(22) Filed: Jan. 2, 2018

(65) Prior Publication Data

US 2018/0207797 A1 Jul. 26, 2018

(30) Foreign Application Priority Data

Jan. 26, 2017 (JP) ................................. 2017-012336

(51) Int. Cl.
*G01C 21/00* (2006.01)
*B25J 9/16* (2006.01)

(52) U.S. Cl.
CPC ............. *B25J 9/163* (2013.01); *B25J 9/1694* (2013.01); *B25J 9/1697* (2013.01); *Y10S 901/02* (2013.01); *Y10S 901/23* (2013.01); *Y10S 901/46* (2013.01); *Y10S 901/47* (2013.01)

(58) Field of Classification Search
CPC ........ B25J 9/163; B25J 9/1697; B25J 9/1694; Y10S 901/47; Y10S 901/46; Y10S 901/23; Y10S 901/02
See application file for complete search history.

(56) References Cited

U.S. PATENT DOCUMENTS 5,696,999 A * 12/1997 Matsushima ........ G02B 27/646
359/554
5,892,635 A * 4/1999 Morita ............... G11B 5/59633
360/73.03

(Continued)

FOREIGN PATENT DOCUMENTS

DE 602005003194 T2 8/2008
DE 102014111613 A1 2/2015

(Continued)

*Primary Examiner* — Ian Jen
(74) *Attorney, Agent, or Firm* — Hauptman Ham, LLP (57) ABSTRACT

A robot control system includes an operation control unit, a learning control processing unit and a storage unit. Whenever the operation control unit performs a single learning control, the learning control processing unit stores the number of learning controls, which indicates how many learning controls have been performed, and obtained time-series vibration data in correspondence with each other in the storage unit. The learning control processing unit calculates a convergence determination value to determine whether or not a vibration of a certain portion of a robot converges based on the time-series vibration data at each number of learning controls stored in the storage unit, and determines the number of learning controls having a minimum convergence determination value, out of the calculated convergence determination values, as the optimal number of learning controls.

7 Claims, 8 Drawing Sheets (56) References Cited

U.S. PATENT DOCUMENTS

| | | | |
|---|---|---|---|
| 8,922,937 B1* | 12/2014 | Chahwan | G11B 19/042 360/55 |
| 2002/0093754 A1* | 7/2002 | Zhang | G11B 5/59611 360/77.04 |
| 2003/0057346 A1* | 3/2003 | Wakui | F16F 15/02 248/550 |
| 2004/0085035 A1* | 5/2004 | Tazawa | H02P 6/06 318/432 |
| 2008/0170320 A1* | 7/2008 | Funabashi | G11B 5/5582 360/75 |
| 2011/0208356 A1 | 8/2011 | Kato et al. | |
| 2016/0070252 A1* | 3/2016 | Imada | H02P 29/00 318/561 |
| 2016/0332303 A1 | 11/2016 | Kirihara | |

FOREIGN PATENT DOCUMENTS

| | | |
|---|---|---|
| DE | 102013011065 B4 | 6/2015 |
| DE | 102014019409 A1 | 7/2015 |
| DE | 102012104194 B4 | 10/2015 |
| JP | H5-54013 A | 3/1993 |
| JP | 2011167817 A | 9/2011 |
| JP | 2014-14897 A | 1/2014 |
| JP | 2015-40535 A | 3/2015 |

* cited by examiner

CONTROL SYSTEM HAVING LEARNING CONTROL FUNCTION AND CONTROL METHOD

RELATED APPLICATIONS

The present application claims priority to Japanese Patent Application No. 2017-012336 filed Jan. 26, 2017, the disclosure of which is hereby incorporated by reference herein in its entirety.

BACKGROUND OF THE INVENTION

1. Field of the Invention

The present invention relates to a control system having a learning control function and a control method.

2. Description of Related Art

In production sites using robots, speedup of the operation of the robots and a reduction in cycle time are sometimes required to improve production efficiency. However, the speedup of the operation of the robots above a certain degree may cause a vibration at a tip end portion of a robot during the operation, owing to lack of rigidity in an arm of the robot itself and the like.

Against this problem, conventionally, an accelerometer is attached to the tip end portion of the robot, and a learning control is performed in a repeated manner, while the accelerometer measures the vibration of the robot during the operation, in order to reduce the vibration (for example, Japanese Unexamined Patent Publication (Kokai) No. 2011-167817). In the learning control, a vibration correction amount is calculated to correct the vibration based on the vibration data obtained by the accelerometer during the operation of the robot based on a specific operation program, and the calculated vibration correction amount is stored and used in the next operation control by the same operation program.

SUMMARY OF THE INVENTION

In a learning control at present, the learning control is performed a predetermined number of times. However, the predetermined number is sometimes inappropriate, and the number of learning controls that minimizes the vibration may not be used. Contrarily, the vibration may converge with a number of learning controls fewer than the predetermined number. In this case, redundant learning controls cause a waste of time. Therefore, it is desired to determine the optimal number of learning controls.

A control system according to an aspect of this disclosure includes a driven device driven by a servomotor, a control device for controlling the servomotor to operate the driven device, and a sensor for detecting a value related to the position of a certain portion of the driven device.

The control device includes:

an operation control unit for generating a command value for the servomotor in each control cycle based on an operation program generated in advance, to control the operation of the driven device by the command value; and a learning control processing unit for making the operation control unit repeatedly perform a learning control in which, when an operation control is performed using the operation program, a vibration correction amount is calculated to correct a vibration occurring in the certain portion and the vibration correction amount is applied to the next operation control by the operation program.

The learning control processing unit includes:

a vibration amount estimation unit for estimating time-series vibration data occurring in the certain portion during the single learning control, based on time-series data of a detection value detected by the sensor and time-series data of the command value generated by the operation control unit, while the operation control unit performs the single learning control;

a vibration correction amount calculation unit for calculating the vibration correction amount to be applied to the next operation control by the operation program, based on the time-series vibration data;

a storage unit, whenever the operation control unit performs the single learning control, the storage unit storing the number of learning controls indicating how many learning controls have been performed and the time-series vibration data in correspondence with each other; and a determination unit for calculating a convergence determination value to determine whether or not the vibration of the certain portion converges based on the time-series vibration data at each number of learning controls stored in the storage unit, and determines the number of learning controls having a minimum convergence determination value, out of the calculated convergence determination values, as the optimal number of learning controls.

A method for controlling the operation of a driven device by controlling a servomotor for driving the driven device according to another aspect of this disclosure has a learning control processing stage for repeatedly performing a learning control in which, when an operation control is performed using the servomotor based on an operation program for controlling the operation of the driven device, a vibration correction amount is calculated to correct a vibration occurring in a certain portion of the driven device and the vibration correction amount is applied to the next operation control by the operation program.

The learning control processing stage includes the steps of:

while the single learning control is performed, obtaining time-series data of a value related to the position of the certain portion and time-series data of a command value generated by the operation program, and estimating time-series vibration data occurring in the certain portion during the single learning control, based on the time-series data of the position-related value and the time-series data of the command value;

calculating the vibration correction amount to be applied to the next operation control by the operation program, based on the time-series vibration data;

whenever the single learning control is performed, storing the number of learning controls indicating how many learning controls have been performed and the time-series vibration data in correspondence with each other in a storage unit; and calculating a convergence determination value to determine whether or not the vibration of the certain portion converges based on the time-series vibration data at each number of learning controls stored in the storage unit, and determining the number of learning controls having a minimum convergence determination value, out of the calculated convergence determination values, as the optimal number of learning controls.

The objects, features, and advantages of the present invention will become more apparent from the following detailed description of embodiments, along with the accompanying drawings.

DETAILED DESCRIPTION OF THE INVENTION

An embodiment of this disclosure will be described with reference to the drawings. In the drawings, the same reference numerals indicate the same structural components or the same functional components. For ease of understanding, the drawings are appropriately modified in scale. The drawings show merely an example to embody the present invention, and the present invention is not limited to the embodiment.

Figure 1:
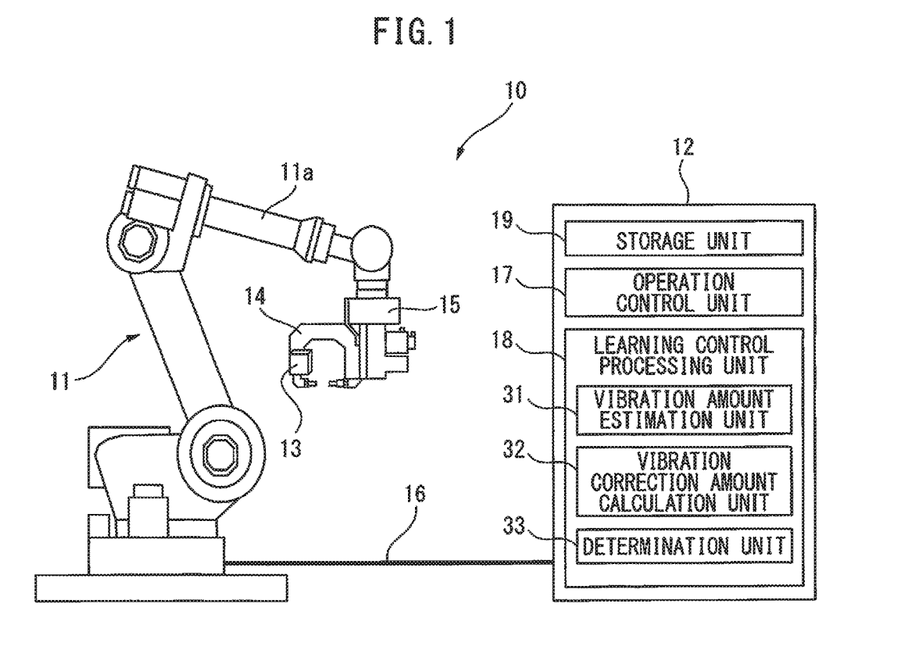
FIG. 1 is a drawing of the configuration of a robot control system according to an embodiment.
Figure 2:
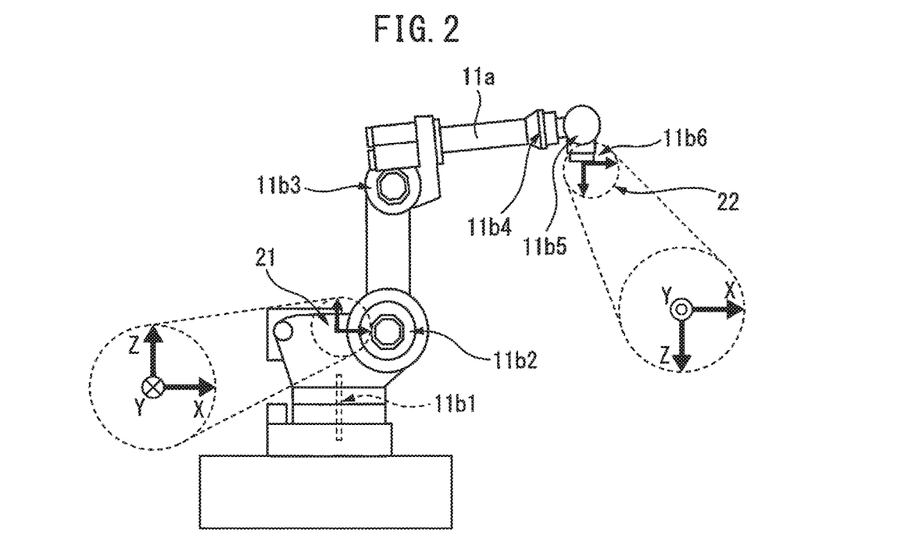
FIG. 2 is a drawing of components and coordinates of a robot shown in FIG. 1.

FIG. 1 is a drawing of the configuration of a robot control system 10 according to an embodiment. FIG. 2 is a drawing of components and coordinates of a robot 11 shown in FIG. 1.

As shown in FIG. 1, the robot control system 10 according to this embodiment includes a robot 11, a control device 12 and a sensor 13.

The robot 11 is driven by a servomotor. The control device 12 is a device to operate the robot 11 by controlling the servomotor. The sensor 13 detects a value related to the position of a certain portion of the robot 11. The position-related value refers to a value that indicates a physical position directly or indirectly such as a three-dimensional position, a speed, an acceleration, a torque, moment and the like.

The control device 12 includes an operation control unit 17, a learning control processing unit 18 and a storage unit 19.

The operation control unit 17 has the function of generating a command value, e.g., a position command value, a speed command value or the like, for the servomotor in each control cycle based on an operation program generated in advance, in order to control the operation of the robot 11 by the command value. This operation control is a servo control.

The learning control processing unit 18 has the function of making the operation control unit 17 repeatedly perform a learning control in which, when an operation control for the robot 11 is performed using the operation program, a vibration correction amount is calculated to correct a vibration occurring in the certain portion, and the vibration correction amount is applied to the next operation control for the robot 11 by the same operation program. In other words, the learning control processing unit 18 makes the operation control unit 17 execute the same operation program in a repeated manner. Whenever an operation control for the robot 11 is performed using the operation program, the vibration correction amount is applied to the operation control while being updated. Therefore, the vibration occurring in the certain portion of the robot 11 is reduced.

For example, in a production site, before the robot 11 is actually operated by an operation program, the learning control processing unit 18 makes the operation control unit 17 perform a learning control in a repeated manner under the same operation program as the actual operation. The learning control processing unit 18 reduces vibration using a vibration correction amount. The greater the number of times the operation program is executed, the more precisely the vibration of the certain portion is corrected. When the vibration is sufficiently reduced, the control device 12 stores the latest calculated vibration correction amount in the storage unit 19 of the control device 12, and the stored vibration correction amount is used when actually operating the robot 11 by the operation program in the production site. Note that, vibration data of the certain portion, which is required for calculating the vibration correction amount, can be obtained based on time-series data of a command value for the servomotor and time-series data of a detection value of the sensor 13.

The storage unit 19 is a component for storing data handled by the learning control processing unit 18. For example, when the above-described learning control is performed, the storage unit 19 stores the time-series data of the detection value of the sensor 13, the calculated vibration correction amount, and the like.

Furthermore, as shown in FIG. 1, the learning control processing unit 18 includes a vibration estimation unit 31, a vibration correction amount calculation unit 32, and a determination unit 33.

The vibration estimation unit 31 estimates time-series vibration data occurring in the certain portion during a single learning control, based on time-series data of a value (hereinafter referred to as detection value) detected by the sensor 13 and time-series data of a command value generated by the operation control unit 17 while the operation control unit 17 performs the single learning control.

The detection value of the sensor 13 is a value related to the position of the certain portion. Thus, for example, when a position command value is subtracted from the detection value of the sensor 13 in each control cycle, a displacement of the certain portion relative to the position command value, i.e., time-series vibration data, is obtained.

The time-series vibration data at the certain portion may be obtained based on time-series data of a detection value of the sensor 13 and time-series positional data detected by an encoder (not shown) mounted on the servomotor of the robot 11 during the single learning control. In other words, a vibration in the certain portion may be defined as the difference between a value related to the position of the certain portion detected by the sensor 13 and the actual position of the servomotor obtained by the encoder. In the present invention, the actual position of the servomotor is included in the command value to be used for estimating the time-series vibration data.

The vibration correction amount calculation unit 32 calculates a vibration correction amount to be applied to the next operation control of the robot 11 by the same operation program, based on the obtained time-series vibration data. The vibration correction amount is a function that is calculated by obtaining vibration data occurring in the certain portion in each control cycle, estimating an approximate equation of the vibration data, and inversely transforming the estimated approximate equation.

Whenever the operation control unit 17 performs a single learning control, the storage unit 19 stores the number of learning controls, which indicates how many learning controls have been performed, and the time-series vibration data in correspondence with each other.

The determination unit 33 calculates a convergence determination value to determine whether or not the vibration of the certain portion converges, based on the time-series vibration data at each number of learning controls. The determination unit 33 determines the number of learning controls having a minimum convergence determination value out of the obtained convergence determination values as the optimal number of learning controls.

The convergence determination value may be, for example, at least any one of a standard deviation, a maximum amplitude, an overshoot and a stabilization time in at least a part of the time-series vibration data. The convergence determination value and a method for calculating the convergence determination value will be described later in detail.

Furthermore, after an i-th ("i" is a positive integer) learning control is completed, the determination unit 33 may calculate convergence determination values based on the time-series vibration data at the i-th learning control and the time-series vibration data at the (i−1)-th learning control, the time-series vibration data being stored in the storage unit (19). When the difference between the two calculated convergence determination values is equal to or less than a predetermined threshold value, the determination unit 33 determines that the vibration of the certain portion has converged, so the learning controls are completed at the i-th number.

When the difference between the two calculated convergence determination values exceeds the predetermined threshold value, the learning control processing unit 18 determines that the vibration of the certain portion has not yet converged, and thus performs another learning control.

Note that, the control device 12 may be constituted of a computer system including a storage unit, a CPU (control processing unit), a communication control unit, and the like connected to each other through a bus. The storage unit is a ROM (read only memory), a RAM (random access memory), or the like. The storage unit 19 according to this embodiment may be a RAM. To achieve the functions and operations of the operation control unit 17 and the learning control processing unit 18, which includes the vibration amount estimation unit 31, the vibration correction amount calculation unit 32, the determination unit 33 and the like, the CPU inputs and outputs data to and from the RAM and executes arithmetic operations on the data.

In this embodiment, as shown in FIG. 1, the robot 11 is a six-axis vertical articulated robot. As shown in FIG. 2, the robot 11 includes six articulated shafts 11b1 to 11b6, an arm 11a coupled to each of the articulated shafts 11b1 to 11b6, and servomotors (not shown) for driving each of the articulated shafts 11b1 to 11b6. As a matter of course, the robot 11 is not limited to that illustrated in FIG. 1, but may be a horizontal articulated robot, a parallel link robot and the like.

The sensor 13 is attached to an end effector 14 provided at a tip end portion 15 of the robot 11. Thus, the sensor 13 according to this embodiment obtains a value related to the actual position of the tip end portion 15 of the robot 11. As the end effector 14, a tool, a hand, a screwer, a welding gun or the like can be used.

As shown in FIG. 2, the robot 11 has world coordinates 21 fixed in space and mechanical interface coordinates 22 set in a flange at a tip end of a wrist of the robot 11. The world coordinates 21 and the mechanical interface coordinates 22 are three-dimensional rectangular coordinates.

Note that, the world coordinates 21 and the mechanical interface coordinates 22 are illustrated in FIG. 2 in an enlarged manner for the sake of convenience. In the world coordinates 21, the +X axis is defined to be the right direction of FIG. 2, the +Z axis is defined to be the upper direction of FIG. 2, and the +Y direction is defined to be the depth direction of the paper of FIG. 2. In the mechanical interface coordinates 22, the +X axis is defined to be the right direction of FIG. 2, the +Z axis is defined to be the lower direction of FIG. 2, and the +Y direction is defined to be the forward direction of the paper of FIG. 2. In the robot control system 10 according to this embodiment, the positional correlation between the world coordinates 21 and the mechanical interface coordinates 22 are found in advance by calibration. Thus, the operation control unit 17 of the control device 12 can control the position of the end effector 14 at the tip end portion 15 of the robot 11 using a position defined in the world coordinates 21.

The control device 12 is mutually connected to the robot 11 through a cable 16. The sensor 13 is communicatably connected to the control device 12 through a cable or wirelessly.

In this embodiment, an accelerometer is used as the sensor 13, but the sensor 13 is not limited to an accelerometer. The sensor 13 is installed at the tip end portion 15 of the robot 11, but the installation position of the sensor 13 is not limited. In other words, the type and installation position of the sensor 13 are arbitrarily changeable as long as the sensor 13 detects a value related to the position of the certain portion of the robot 11 as a target for servo position control. The sensor 13 may be installed in a position away from the robot 11.

Thus, a device for measuring a position and a displacement, e.g., a gyro sensor, an inertial sensor, a force sensor, a laser tracker, a camera, a motion capture device, or the like can be used as the sensor 13.

Figure 3:
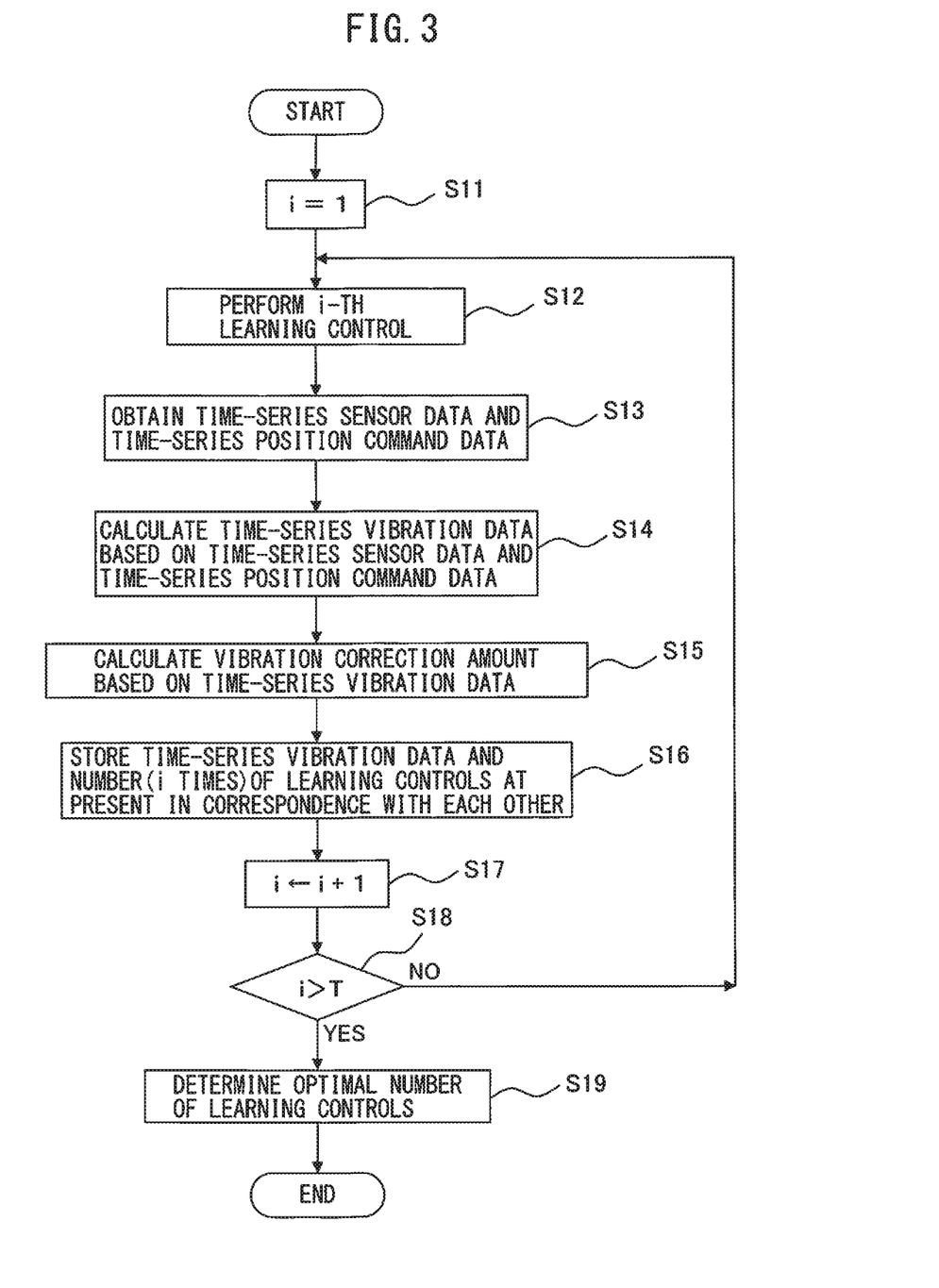
FIG. 3 is a flowchart of the operation of a learning control processing unit shown in FIG. 1.

FIG. 3 is a flowchart showing an example of the operation of the learning control processing unit 18. The operation shown in FIG. 3 is an example of a robot control method of this disclosure.

Referring to FIG. 3, in step S11, the learning control processing unit 18 sets 1 as an initial value of the number i (i is a positive integer) of learning controls, which indicates how many learning controls have been performed by a predetermined operation program.

Next in step S12, the learning control processing unit 18 makes the operation control unit 17 perform the i-th (i is a positive integer) learning control. The operation control unit 17 controls the operation of the robot 11 based on the operation program specified as a target for learning control.

Next in step S13, the vibration amount estimation unit 31 of the learning control processing unit 18 obtains time-series data of a detection value of the sensor 13 (hereinafter abbreviated as time-series sensor data) and time-series data of a position command value for the servomotor of the robot 11 (hereinafter abbreviated as time-series position command data) in the i-th learning control. The position command value is used here, but the command value may be a speed or an acceleration, as described above.

Next in step S14, the vibration amount estimation unit 31 calculates time-series vibration data at the certain portion, based on the time-series sensor data and the time-series position command data.

Next in step S15, the vibration correction amount calculation unit 32 of the learning control processing unit 18 calculates a vibration correction amount based on the time-series vibration data. The calculated vibration correction amount is applied to an operation control for the robot 11 in the next learning control.

Next in step S16, the vibration correction amount calculation unit 32 stores the time-series vibration data and the present number (i times) of learning controls in the storage unit 19 in correspondence with each other. Next, in step S17, the learning control processing unit 18 increments the number (i times) of learning controls by 1.

Next in step S18, the determination unit 33 of the learning control processing unit 18 determines whether or not the number (i times) of learning controls exceeds a predetermined number T (T is a fixed value of a positive integer). When the determination unit 33 does not determine that the number (i times) of learning controls exceeds the predetermined number T, above-described steps S12 to S18 are repeated. The predetermined number T may be inputted from an operation panel, a computer device, or the like connected to the control device 12 at the correct time.

When the determination unit 33 determines that the number (i times) of learning controls exceeds the predetermined number T in step S18, step S19 is performed.

In step S19, the determination unit 33 calculates a convergence determination value based on the time-series vibration data of each number of learning controls stored in the storage unit 19, in order to determine whether or not a vibration of the certain portion converges. The determination unit 33 determines the number of learning controls having a minimum convergence determination value, out of the calculated convergence determination values, as the optimal number of learning controls.

Figure 4:
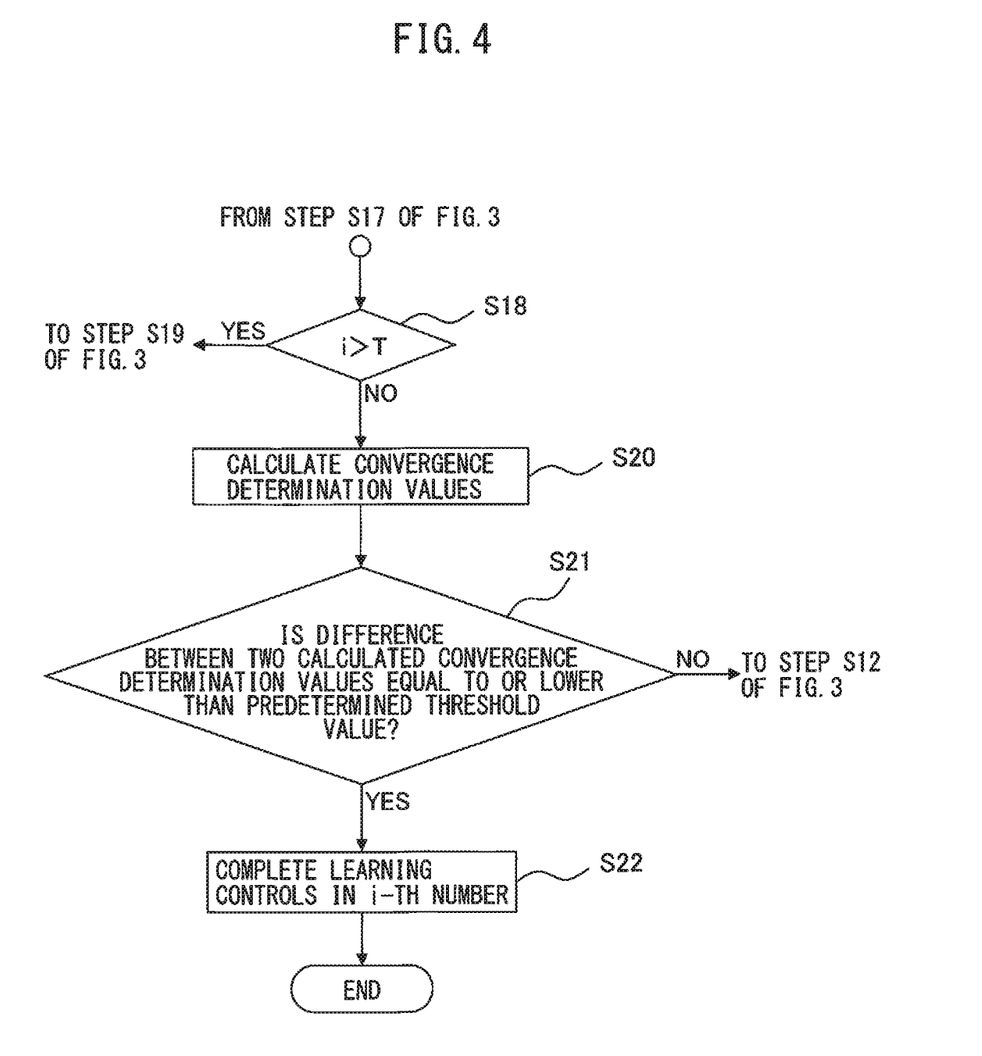
FIG. 4 is a flowchart of an example of an operation that is addable to the operation shown in FIG. 3.

FIG. 4 is a flowchart of an example of an operation that can be added to the operation of FIG. 3.

In the operation of FIG. 3, when the determination unit 33 does not determine that the number (i times) of learning controls exceeds the predetermined number T in step S18, the operation returns to step S12. While the operation returns from step S18 to step S12, the learning control processing unit 18 can perform an addition operation shown in FIG. 4.

To be more specific, as shown in FIG. 4, when the determination unit 33 does not determine that the number (i times) of learning controls exceeds the predetermined number T in step S18, step S20 is performed.

In step S20, the determination unit 33 calculates convergence determination values based on the time-series vibration data at the i-th learning control and the time-series vibration data at the (i−1)-th learning control.

Next in step S21, the determination unit 33 determines whether or not the difference between the calculated two convergence determination values is equal to or less than a certain threshold value. As a result of this, when the difference between the two convergence determination values is determined to be equal to or less than the threshold value, the determination unit 33 determines that the vibration of the certain portion has converged and completes the learning controls in the i-th number (step S22).

On the other hand, when the difference between the two convergence determination values is determined to exceed the threshold value in step S21, the determination unit 33 performs the operation of step S12 or later again, as shown in FIG. 3. The determination unit 33 repeats a series of steps S12 to S18, S20 and S21, until a determination result indicating that the difference between the two convergence determination values is determined to be equal to or less than the threshold value is obtained in step S21.

The certain threshold value can be also inputted from an operation panel, a computer device, or the like connected to the control device 12 at the correct time.

The above-described operation performed by the learning control processing unit 18 will be described in more detail with one concrete example.

To obtain a value related to the position of the tip end portion 15 of the robot 11, as shown in FIG. 1, the sensor 13 is attached to the end effector 14 of the tip end portion 15. As an example, a tri-axial accelerometer (hereinafter simply referred to as "accelerometer") is used as the sensor 13.

In this example, when the operation control unit 17 repeatedly controls the operation of the robot 11 by a predetermined operation program in a learning control processing stage, the tip end portion 15 of the robot 11 performs the same linear operation. In this example, the operation control unit 17 generates a position command value in each certain control cycle based on the operation program for making the robot 11 perform the linear operation, and performs a feedback control of the servomotor of the robot 11 using the generated position command value to control the position of the tip end portion 15 of the robot 11.

Figure 5:
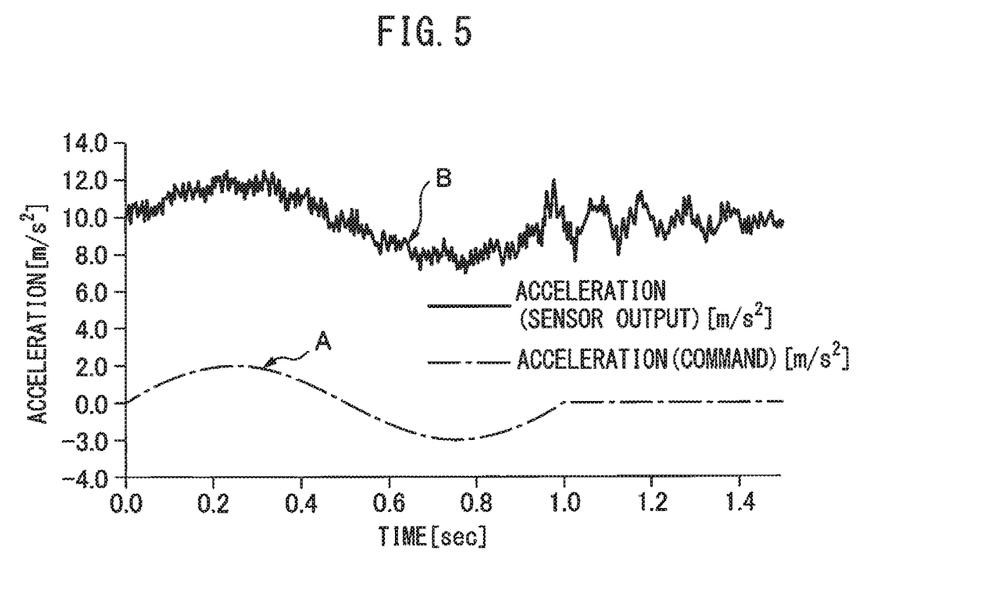
FIG. 5 is a graph of variations in an acceleration command value calculated from a position command value and a detection value of an accelerometer with time, when a learning control is performed.

FIG. 5 is a graph of variations in an acceleration command value calculated from the position command value and a detection value of the accelerometer with time, when a learning control is performed. In FIG. 5, the alternate long and short dashed line indicated by A represents time-series data of the acceleration command value calculated from the position command value, i.e., time-series acceleration command data. The solid line indicated by B represents time-series data of the detection value (actual value) of the accelerometer, i.e., time-series sensor data. As shown in FIG. 5, the movement speed of the tip end portion 15 of the robot 11 is accelerated between 0 sec and 0.5 sec, and is decelerated between 0.5 sec and 1.0 sec. The movement of the tip end portion 15 is stopped after 1.0 sec. The acceleration command value is calculated by double differentiation of the position command value.

As described above, when the learning control is performed, the detection value of the accelerometer contains the following four components. To calculate a vibration correction amount for the learning control, only the following component (a) is required.

(a) the amount of vibration at a portion to which the accelerometer is attached (hereinafter abbreviated as sensor attachment portion)

(b) acceleration and deceleration at the sensor attachment portion (c) electrical noise (d) acceleration of gravity acting on the accelerometer Therefore, removing the components (b) to (d) from the detection value of the accelerometer facilitates obtaining only the component (a) to calculate the vibration correction amount.

For example, when a learning control is performed using an accelerometer, the position and orientation of the accelerometer attached to the robot 11 has to be obtained in advance. To be more specific, the correlation between an origin point of the world coordinates 21 of the robot 11 shown in FIG. 2 and an origin point of sensor coordinates of the accelerometer attached to the robot 11 is obtained in advance, as information on the position of the accelerometer. Furthermore, the correlation between the orientation of the three rectangular axes of the sensor coordinates of the attached accelerometer and the orientation of the three rectangular axes of the world coordinates 21 is obtained in advance, as information on the orientation of the accelerometer.

As described above, the detection value of the accelerometer contains the acceleration of gravity. Thus, the acceleration of gravity cannot be appropriately removed from the detection value of the accelerometer without the information on the orientation of the attached accelerometer. The acceleration of gravity contained in each of three-dimensional components of the detection value of the accelerometer can be obtained from the information on the orientation of the accelerometer.

Figure 6:
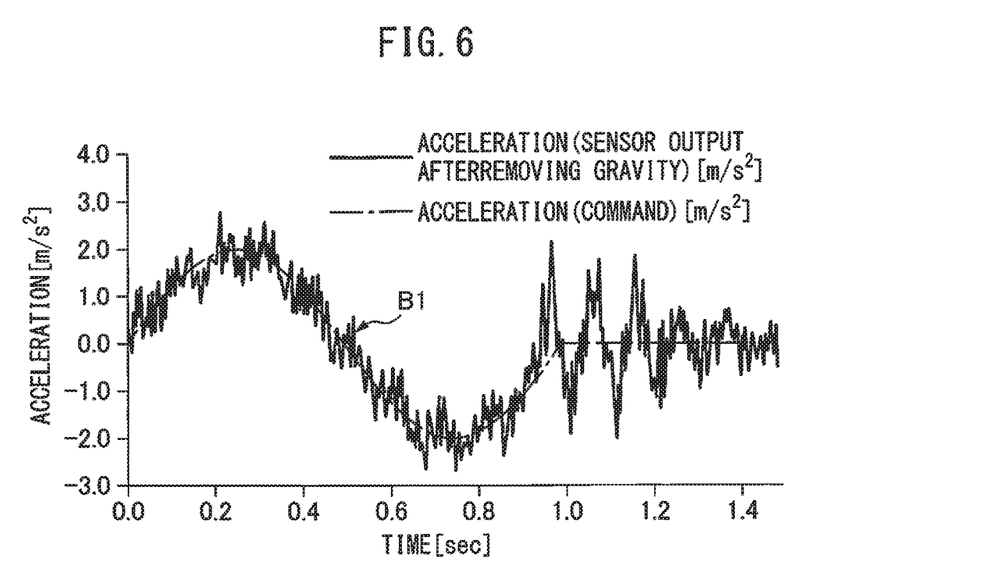
FIG. 6 is a graph of time-series data after acceleration of gravity is removed from the time-series sensor data of FIG. 5.

FIG. 6 is a graph of time-series data after the acceleration of gravity is removed from the time-series sensor data of FIG. 5. When the acceleration of gravity is subtracted from the time-series data (indicated by B in FIG. 5) of the detection value of the accelerometer, as shown in FIG. 6, time-series sensor data B1 after the subtraction of the acceleration of gravity has the same phase as the time-series position command data.

Figure 7:
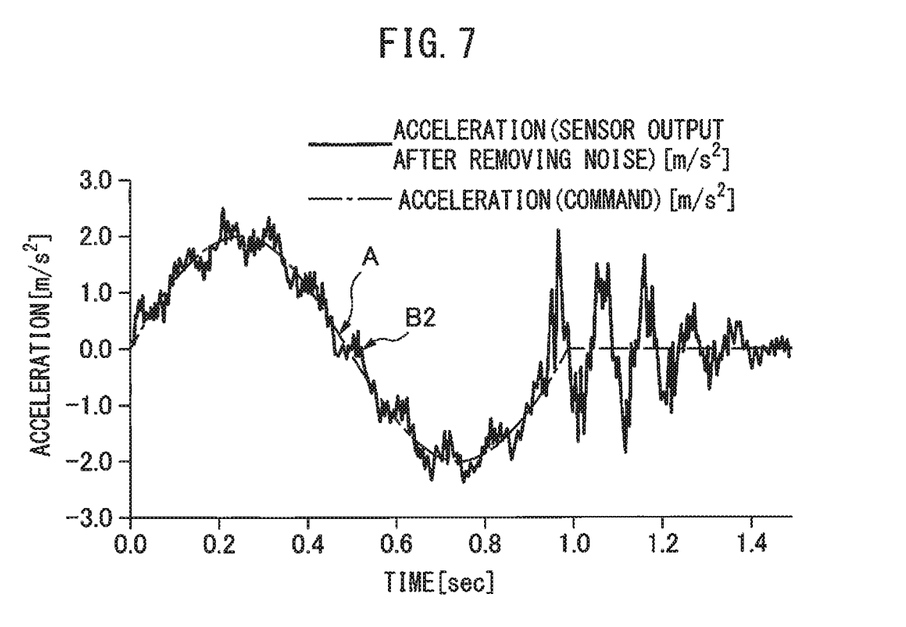
FIG. 7 is a graph of time-series data after electrical noise is removed from the time-series sensor data of FIG. 6.

FIG. 7 is a graph of time-series data after electrical noise is removed from the time-series sensor data B1 of FIG. 6. When the time-series data (indicated by B1 in FIG. 6) of the detection value of the accelerometer after the subtraction of the acceleration of gravity is applied to a low-pass filter, as shown in FIG. 7, time-series sensor data B2 having no electrical noise is obtained.

Figure 8:
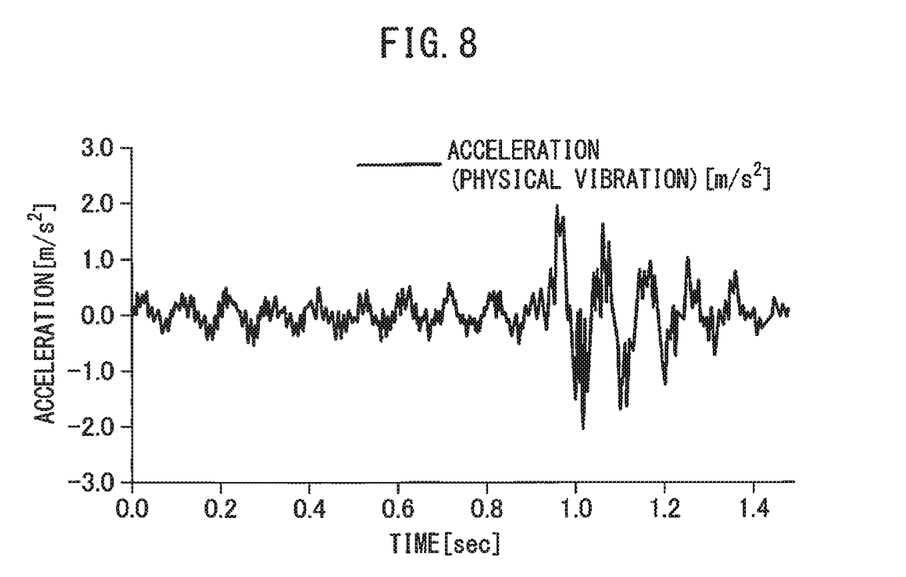
FIG. 8 is a graph of time-series vibration data at a sensor attachment portion.

FIG. 8 is a graph of time-series vibration data at the sensor attachment portion. When the time-series acceleration command data A is subtracted from the time-series sensor data B2 shown in FIG. 7, as shown in FIG. 8, time-series vibration data at the sensor attachment portion is obtained. Note that, as is apparent from the above description, the time-series vibration data is obtained on the order of acceleration in this concrete example.

In the concrete example, when the learning control processing unit 18 makes the operation control unit 17 perform the single learning control, the time-series data of the detection value of the accelerometer and the time-series data of the acceleration command value for the servomotor of the robot 11 are stored in the storage unit 19. The learning control processing unit 18 stores the time-series data of the acceleration command value, which is calculated by double differentiation of the position command value, in the storage unit 19.

The vibration amount estimation unit 31 of the learning control processing unit 18 can estimate the time-series vibration data at the sensor attachment portion, based on the time-series data of the detection value of the accelerometer and the time-series data of the acceleration command value. To be more specific, as described above, since the acceleration of gravity, the electrical noise and the acceleration command value are removed from the time-series data of the detection value of the accelerometer at each time interval (at each certain control cycle), only time-series acceleration data at the sensor attachment portion is obtained. In other words, it is possible to obtain the time-series vibration data on the order of acceleration at the sensor attachment portion.

Instead of the position command value, the storage unit 19 may store actual position data of the servomotor, when the servomotor of the robot 11 is operated in response to the position command value, at each time interval. The actual position data of the servomotor can be obtained by an encoder mounted on the servomotor. In this case, after the operation control unit 17 performs a single learning control, the learning control processing unit 18 calculates acceleration data corresponding to the actual position data of the servomotor by double differentiation of the actual position data of the servomotor. The vibration amount estimation unit 31 subtracts the acceleration data calculated from acceleration of gravity, electrical noise and the actual position data of the motor from the time-series data of the detection value of the accelerometer at each time interval (at each certain control cycle), in order to obtain the time-series vibration data on the order of acceleration at the sensor attachment portion.

The vibration correction amount calculation unit 32 of the learning control processing unit 18 calculates a vibration correction amount based on the time-series vibration data as shown in FIG. 8 to cancel the time-series vibration data, and applies the vibration correction amount to the next learning control for controlling the operation of the robot 11 by the same operation program.

Whenever the operation control unit 17 performs a single learning control, the vibration correction amount calculation unit 32 stores the number i of learning controls, which indicates how many learning controls have been performed, and the time-series vibration data as shown in FIG. 8 in correspondence with each other in the storage unit 19. However, as shown in step S18 of the operation flow of FIG. 3, an upper limit to the number i of learning controls is a certain number T.

The determination unit 33 of the learning control processing unit 18 calculates a convergence determination value to determine whether or not the vibration of the certain portion converges, based on the time-series vibration data at each number of learning controls stored in the storage unit 19. Here, a standard deviation is used as the convergence determination value.

The learning control processing unit 18 calculates a standard deviation of the vibration data at each number of learning controls from the following equation.

$$\varepsilon_i = \sqrt{\frac{1}{n}\sum_{k=1}^{n}(a_k - \tilde{a})^2} \qquad \text{Eq. (1)}$$

In the above Eq. (1), $\varepsilon_i$ (i is the number of learning controls) represents a standard deviation, $a_k$ represents vibration data pieces at the sensor attachment portion at each time interval shown in FIG. 8, and n represents the number of the data pieces. Furthermore, ã is an average value of the n number of vibration data pieces $a_k$.

The standard deviation may be calculated from the time-series vibration data in a time period including both of a stop time period (1.0 sec or later) and an acceleration and deceleration time period (0 sec to 1.0 sec), or the time-series vibration data only in the stop time period.

The determination unit 33 of the learning control processing unit 18 sequentially calculates a standard deviation of the vibration data at each number of learning controls stored in the storage unit 19 from above Eq. (1), and determines the number i of learning controls having a minimum standard deviation, out of the calculated standard deviations, as the optimal number of learning controls.

Repetition of the learning control under the same operation program gradually reduces the standard deviation of the vibration data in each learning control. When the learning control is repeated a certain number of times or more, a variation in the standard deviation becomes small, or contrarily becomes large.

After the i-th learning control has been completed, the determination unit 33 of the learning control processing unit 18 according to this concrete example may calculate a standard deviation from the above Eq. (1) based on the time-series vibration data at the i-th learning control and the time-series vibration data at the (i−1)-th learning control. In this case, when the difference between the two standard deviations $(\varepsilon_i-\varepsilon_{i-1})$ is determined to be equal to or less than a certain threshold value, the determination unit 33 determines that the vibration of the certain portion has converged, so the learning control is completed in the i-th number.

As described above, the control device 12 of the robot control system 10 automatically determines the optimal number of learning controls. The single robot 11 sometimes performs different operations by appropriate switching. In such a case, when the control device 12 performs a learning control based on each operation program, it is possible to automatically determine the optimal number of learning controls that can reduce a vibration of a certain portion of the robot 11 on each operation program.

Furthermore, whenever a learning control is repeated on the same operation program, the control device 12 of the robot control system 10 determines whether or not a vibration of a certain portion of the robot 11 has converged, and completes the learning control at a point of time when the vibration is determined to have converged. Therefore, the learning control is repeated a minimum required number of times for a minimum required period of time.

Note that, a standard deviation is used as a convergence determination value in the above concrete example, but the convergence determination value is not limited to the standard deviation. As the convergence determination value, at least any one of the standard deviation, a maximum amplitude, an overshoot and a stabilization time in at least a part of time-series vibration data, as shown in FIG. 8, can be used. The maximum amplitude, the overshoot and the stabilization time that are usable as the convergence determination value will be described.

Figure 9:
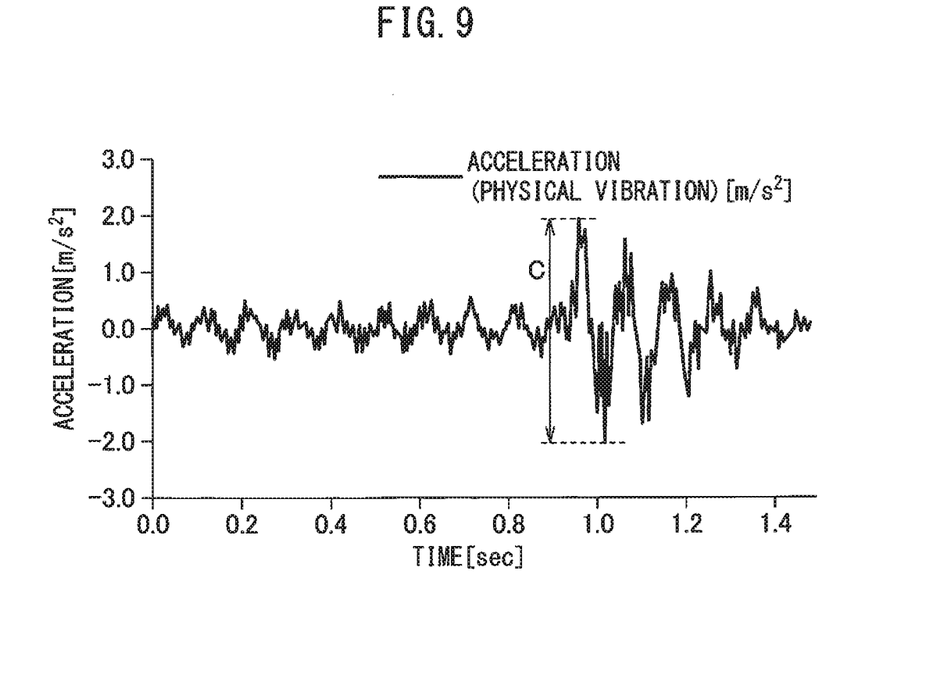
FIG. 9 is a graph for explaining a maximum amplitude that is an example of a convergence determination value.

FIG. 9 is a graph for explaining a maximum amplitude, which is an example of the convergence determination value. In the vibration data shown in FIG. 9, the maximum amplitude corresponds to a portion indicated by the arrow C. The maximum amplitude is the difference between the maximum value and the minimum value of the time-series vibration data. The maximum value and the minimum value are extracted from the time-series vibration data shown in FIG. 9, and the difference between the extracted maximum value and the minimum value is calculated to obtain the maximum amplitude. The maximum amplitude can be also calculated from the time-series vibration data in a time period including both of a stop time period (1.0 sec or later) and an acceleration and deceleration time period (0 sec to 1.0 sec), or the time-series vibration data only in a stop time period.

Figure 10A:
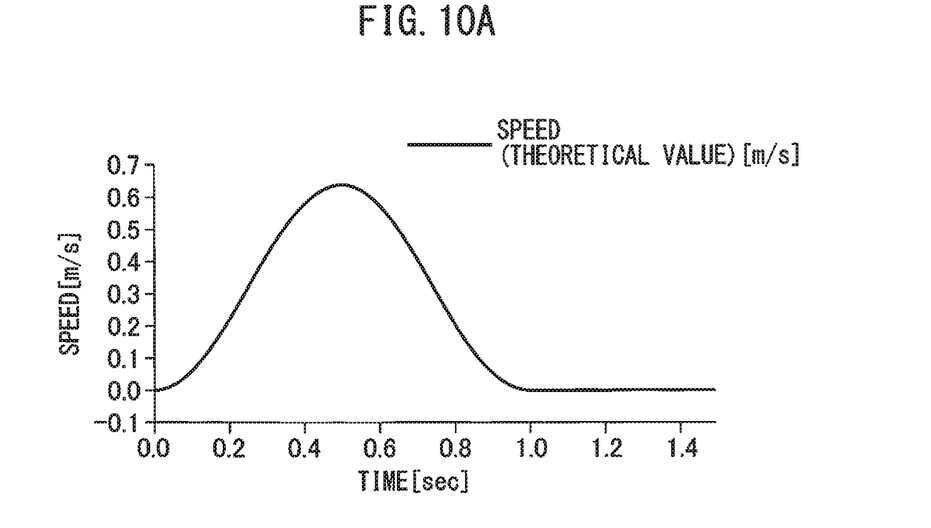
FIG. 10A is a graph of time-series data after a vibration on the order of acceleration is single integrated at each time of FIG. 8.
Figure 10B:
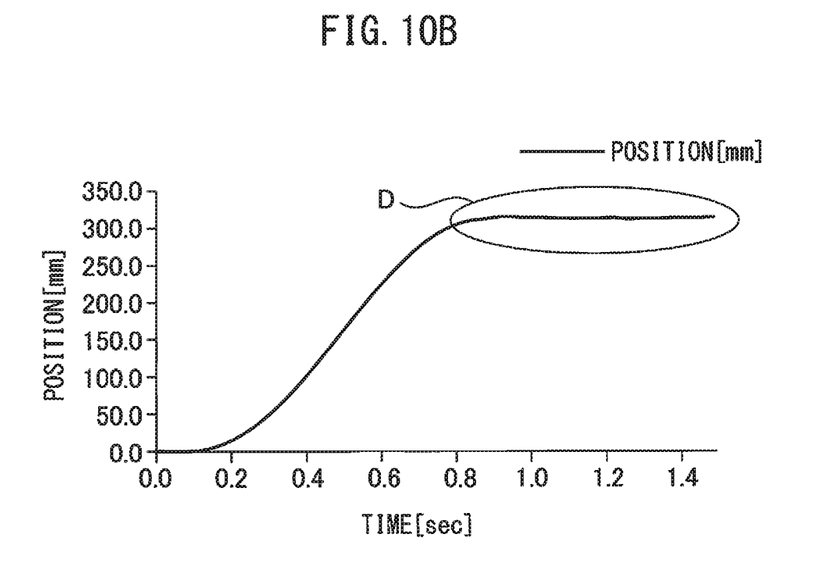
FIG. 10B is a graph of time-series data after a vibration on the order of speed is single integrated at each time of FIG. 10A.
Figure 10C:
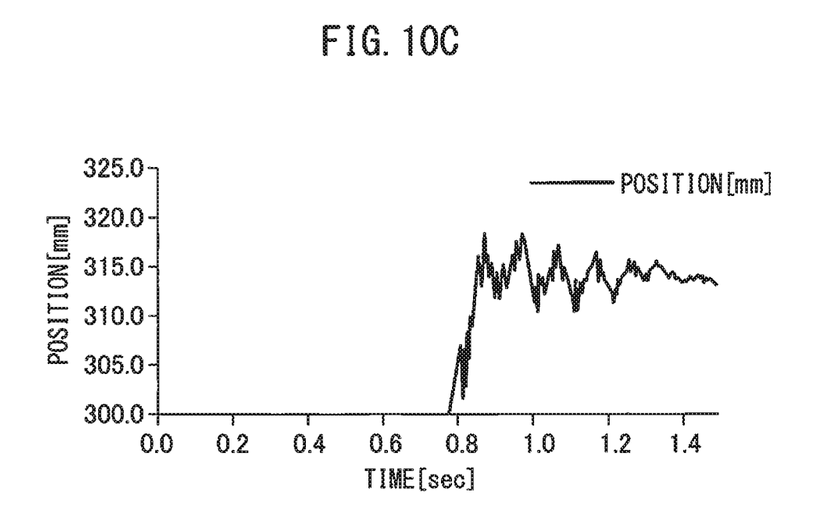
FIG. 10C is a graph showing a part of data enclosed by a line C of FIG. 10B with enlargement.

To calculate the overshoot or the stabilization time, time-series vibration data on the order of acceleration, as shown in FIGS. 8 and 9, is converted into time-series vibration data on the order of position. The position is calculated by double integration of the acceleration. FIG. 10A is a graph of time-series data after the vibration on the order of acceleration is single integrated at each time of FIG. 8, in other words, time-series vibration data on the order of speed. FIG. 10B is a graph of time-series data after the vibration on the order of speed is single integrated at each time of FIG. 10A, in other words, time-series vibration data on the order of position. FIG. 10C is a graph showing a part of data enclosed by line C of FIG. 10B with enlargement.

Figure 11:
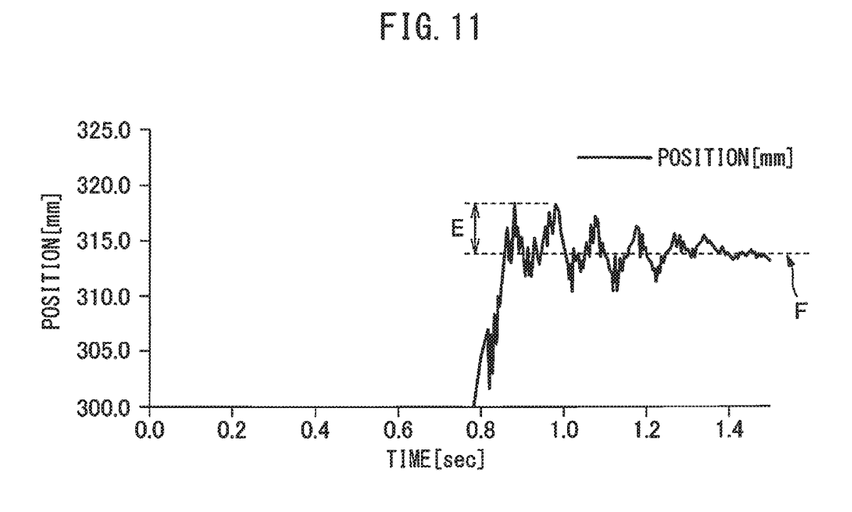
FIG. 11 is a graph showing an overshoot, which is an example of the convergence determination value, using the enlarged view of FIG. 10C.

FIG. 11 is a graph showing an overshoot, which is an example of the convergence determination value, using the enlarged view of FIG. 10C. In the time-series vibration data shown in FIG. 11, the overshoot corresponds to the portion indicated by arrow E. More specifically, the overshoot is the maximum value of excess with respect to the final position F. The final position F and the maximum value are determined from the time-series vibration data shown in FIG. 11, and the difference between the determined position F and the determined maximum value is calculated to obtain the overshoot.

Figure 12:
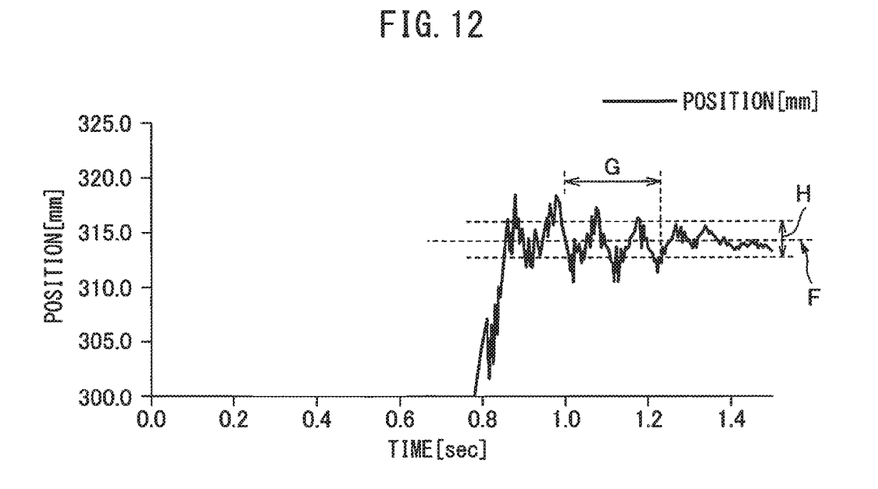
FIG. 12 is a graph showing a stabilization time, which is an example of the convergence determination value, using the enlarged view of FIG. 10C.

FIG. 12 is a graph showing a stabilization time, which is an example of the convergence determination value, using the enlarged view of FIG. 10C. In time-series vibration data shown in FIG. 12, the stabilization time corresponds to the portion indicated by arrow G. More specifically, the stabilization time is the time between when the robot stops (1.0 sec in this embodiment) and when the vibration data converges within a certain stabilization width relative to the final position F by the learning control. The final position F is identified, and a first time when the vibration data converges within the certain stabilization width H is identified from the vibration data shown in FIG. 11. Calculating the difference between the identified time and the stop time facilitates obtaining the stabilization time.

Note that, the learning control of the robot 11 driven by the servomotor is described above, but the method for determining the optimal number of learning controls according to the present invention is applicable to any device as long as the device is driven by a servomotor. Therefore, the present invention is also applicable to, for example, a machine tool driven by a motor.

The present invention is described using the typical embodiment, but it is apparent for those skilled in the art that the above-described and other various modifications, omissions and additions can be applied to the above-described embodiment within the scope of the present invention.

The invention claimed is:

1. A control system comprising a driven device driven by a servomotor, a control device for controlling the servomotor to operate the driven device, and a sensor for detecting a value related to the position of a certain portion of the driven device, wherein
the control device includes:
an operation control unit for generating a command value for the servomotor in each control cycle based on an operation program generated in advance, to control the operation of the driven device by the command value; and a learning control processing unit for making the operation control unit repeatedly perform a learning control in which, when an operation control is performed using the operation program, a vibration correction amount is calculated to correct a vibration occurring in the certain portion and the vibration correction amount is applied to the next operation control by the operation program, and the learning control processing unit includes:

a vibration amount estimation unit for estimating time-series vibration data occurring in the certain portion during the single learning control, based on time-series data of a detection value detected by the sensor and time-series data of the command value generated by the operation control unit while the operation control unit performs the single learning control;

a vibration correction amount calculation unit for calculating the vibration correction amount to be applied to the next operation control by the operation program, based on the time-series vibration data;

a storage unit, whenever the operation control unit performs the single learning control, the storage unit storing the number of learning controls indicating how many learning controls have been performed and the time-series vibration data in correspondence with each other; and a determination unit for calculating a convergence determination value to determine whether or not the vibration of the certain portion converges based on the time-series vibration data at each number of learning controls stored in the storage unit, and determines the number of learning controls having a minimum convergence determination value out of the calculated convergence determination values as the optimal number of learning controls.

2. The control system according to claim 1, wherein after an i-th (i is a positive integer) learning control is completed, the determination unit calculates the convergence determination values based on the time-series vibration data at the i-th learning control and the time-series vibration data at the (i−1)-th learning control, the time-series vibration data being stored in the storage unit, and when the difference between the calculated two convergence determination values is equal to or less than a predetermined threshold value, the determination unit determines that the vibration of the certain portion has converged, and completes the learning controls in the i-th number.

3. The control system according to claim 1, wherein the convergence determination value is at least any one of a standard deviation, a maximum amplitude, an overshoot and a stabilization time in at least a part of the time-series vibration data.

4. The control system according to claim 1, wherein the sensor is an accelerometer, a gyro sensor, an inertial sensor, a force sensor, a laser tracker, a camera, or a motion capture device.

5. A method for controlling the operation of a driven device by controlling a servomotor for driving the driven device, the method having a learning control processing stage for repeatedly performing a learning control in which, when an operation control is performed using the servomotor based on an operation program for controlling the operation of the driven device, a vibration correction amount is calculated to correct a vibration occurring in a certain portion of the driven device and the vibration correction amount is applied to the next operation control by the operation program, the learning control processing stage comprising the steps of:

while the single learning control is performed, obtaining time-series data of a value related to the position of the certain portion and time-series data of a command value generated by the operation program, and estimating time-series vibration data occurring in the certain portion during the single learning control, based on the time-series data of the position-related value and the time-series data of the command value;

calculating the vibration correction amount to be applied to the next operation control by the operation program, based on the time-series vibration data;

whenever the single learning control is performed, storing the number of learning controls indicating how many learning controls have been performed and the time-series vibration data in correspondence with each other in a storage unit; and calculating a convergence determination value to determine whether the vibration of the certain portion converges or not based on the time-series vibration data at each number of learning controls stored in the storage unit, and determining the number of learning controls having a minimum convergence determination value, out of the calculated convergence determination values, as the optimal number of learning controls.

6. The method according to claim 5, wherein the learning control processing stage further comprises the step of:

after an i-th (i is a positive integer) learning control is completed, calculating the convergence determination values based on the time-series vibration data at the i-th learning control and the time-series vibration data at the (i−1)-th learning control, the time-series vibration data being store in the storage unit, and when the difference between the two calculated convergence determination values is equal to or less than a predetermined threshold value, determining that the vibration of the certain portion has converged, and completing the learning controls in the i-th number.

7. The method according to claim 5, wherein the convergence determination value is at least any one of a standard deviation, a maximum amplitude, an overshoot and a stabilization time in at least a part of the time-series vibration data.

* * * * *